United States Patent
Sellmann et al.

(10) Patent No.: US 8,058,388 B2
(45) Date of Patent: Nov. 15, 2011

(54) PROCESS FOR ALKOXYLATION WITH DMC CATALYSTS IN A LOOP REACTOR WITH EJECTOR

(75) Inventors: Andreas Sellmann, Ratingen (DE); Irina Neisius-Sellmann, legal representative, Ratingen (DE); Volker Zellmer, Bottrop (DE)

(73) Assignee: Evonik Goldschmidt GmbH, Essen (DE)

( * ) Notice: Subject to any disclaimer, the term of this patent is extended or adjusted under 35 U.S.C. 154(b) by 359 days.

(21) Appl. No.: 12/277,903

(22) Filed: Nov. 25, 2008

(65) Prior Publication Data

US 2009/0292084 A1      Nov. 26, 2009

(30) Foreign Application Priority Data

Nov. 28, 2007 (DE) .......................... 10 2007 057 147

(51) Int. Cl.
*C08G 65/34* (2006.01)
(52) U.S. Cl. ........ 528/425; 564/505; 568/623; 568/624; 568/620; 568/679
(58) Field of Classification Search .................. 528/425; 564/505; 568/623, 624, 620, 679
See application file for complete search history.

(56) References Cited

U.S. PATENT DOCUMENTS

| | | | |
|---|---|---|---|
| 5,159,092 | A | 10/1992 | Leuteritz |
| 6,673,972 | B2 | 1/2004 | Ostrowski et al. |
| 6,838,061 | B1 | 1/2005 | Berg et al. |

FOREIGN PATENT DOCUMENTS

| | | |
|---|---|---|
| DE | 198 54 637 | 5/2000 |
| EP | 0 419 419 | 3/1991 |
| WO | WO 01/62826 | 8/2001 |

OTHER PUBLICATIONS

Derwent 2001-638918, Bauer et al., Aug. 2001.*

* cited by examiner

*Primary Examiner* — Randy Gulakowski
*Assistant Examiner* — Shane Fang
(74) *Attorney, Agent, or Firm* — Frommer Lawrence & Haug LLP

(57) ABSTRACT

The invention relates to a process for preparing polyethers of the formula (I)

$$R^1-(CHR^2CHR^3-O)_n-H \qquad (I)$$

where
n=1 to 12 000,
$R^1$=a radical comprising at least one carbon atom and
$R^2$ and $R^3$ are each independently H or a hydrocarbon radical, where the units designated with the index n may be the same or different (the $R^2$ and $R^3$ radicals in the different units n may thus be the same or different),
by alkoxylating a starter compound which comprises the $R^1$ radical in the presence of a double metal cyanide catalyst (DMC catalyst) in a loop reactor, which is characterized in that the alkoxylation is performed in a loop reactor which has an ejector mixing nozzle, in which all substances involved in the reaction or assistants can be added to the circulated reaction mixture, an alkylene oxide or a plurality of different alkylene oxides being metered into the reaction mixture via the ejector mixing nozzle at the same time (random addition) or at different times (block addition).

16 Claims, 1 Drawing Sheet

PROCESS FOR ALKOXYLATION WITH DMC CATALYSTS IN A LOOP REACTOR WITH EJECTOR

This application claims benefit under 35 U.S.C. 119(a) of German patent application DE 10 2007 057 147.1, filed on 28 Nov. 2007.

Any foregoing applications, including German patent application DE 10 2007 057 147.1, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to a process for alkoxylation in the presence of double metal cyanide catalysts (DMC catalysts) in a loop reactor with ejector (jet nozzle).

Double metal cyanide catalysts (DMC catalysts) and their use for preparing polyether polyols have been known for a long time. Especially documents EP 0 868 468 (U.S. Pat. No. 5,767,323), EP 0 879 259 (U.S. Pat. No. 5,919,988), EP 0 981 407 (U.S. Pat. No. 5,844,070), EP 0 971 970 (U.S. Pat. No. 6,821,308), EP 1 012 203 (U.S. Pat. No. 5,854,386), EP 1 017 738 (U.S. Pat. No. 6,077,978), EP 1 173 498 (U.S. Pat. No. 6,617,419), EP 1 254 714 (U.S. Pat. No. 6,833,431), EP 1 258 291 (U.S. Pat. No. 6,833,431), EP 1 382 629 (U.S. Pat. No. 6,835,801), EP 1 577 334 (U.S. 2005-209438) and WO 05/042616 (U.S. 2005-085613), and also the documents cited within these documents, describe in detail the preparation of DMC catalysts and the use thereof, especially for preparing polyethers by alkoxylation. The content of the documents mentioned shall be incorporated fully into the disclosure-content of the present invention.

As well as a high reactivity, the DMC catalyst has the advantage in alkoxylation reactions by virtue of its high substrate selectivity that very narrow molar mass distributions can be achieved and that the formation of side reactions is greatly reduced.

However, the DMC catalyst also has certain disadvantages which prevent the use of the polyethers prepared by means of DMC catalysis in particular applications.

The disadvantages of DMC catalysts in alkoxylation processes are in particular:

1. The DMC catalysts have the unfavourable property of being inhibited by particular substances, for example starters of low molar mass (EP 1 017 738). It is thus generally impossible—as in the case of a conventional (e.g. alkaline) catalysis—to initially charge a mixture of low molecular weight alcohol (as the starter compound for the alkoxylation) and catalyst. In DMC-catalysed alkoxylation processes, the addition reaction is therefore started with a substance initially charged in the reactor, in which the catalyst is suspended. The suspension medium may either be a polyether or the starter compound (e.g. alcohol) onto which the alkylene oxide is to be added, or a mixture of the two. The suspension medium is preferably a polyether. Particular preference is given to using, as the suspension medium, a polyether which is still DMC-catalysed. The amount of starter compound (e.g. alcohol) which may be needed to achieve the desired molar mass is then metered in in parallel later together with alkylene oxide. This leads to a very broad and very inhomogeneous molar mass distribution during the phase of parallel addition of starter compound (e.g. alcohol) and alkylene oxide. However, the special feature of DMC catalysts is that, owing to the high selectivity, after the simultaneous addition of alkylene oxide and starter compound (e.g. alcohol) has ended, the molar mass distribution narrows again very greatly in the course of the subsequent exclusive addition of alkylene oxide. However, this can be disadvantageous for particular applications.

2. DMC catalysts typically have to be activated or initialized. The activation can be effected, for example, by removing volatile components from the catalyst by distillation, if appropriate while applying a reduced pressure. The initialization of the catalyst is carried out by adding a very small amount of alkylene oxide to the mixture of the catalyst which may have been pretreated as described and suspension medium. The "startup" of the reaction can be detected by a decline in pressure in the case of alkylene oxides which are gaseous at reaction temperature.

3. Owing to their high selectivity, DMC catalysts tend to form homologous series, i.e. chains of the same type form preferentially in the case of simultaneous addition of different alkylene oxide types. For example, in the case of simultaneous addition of ethylene oxide and propylene oxide, ethylene oxide adds preferentially onto a molecule whose reactive end group has formed by the addition of ethylene oxide. Propylene oxide adds preferentially onto an end group formed by addition of propylene oxide. It is therefore impossible to establish a buildup of molecular structure selectable as desired in terms of its alkylene oxide sequence accompanied by a selectable molecular weight distribution by virtue of a random or batchwise supply of different alkylene oxide types. This phenomenon is particularly marked in the case of low molecular weight alkylene oxides.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

The object of the present invention therefore consisted in the provision of an alternative alkoxylation process which avoids one or more of the above-mentioned disadvantages.

It has been found that, surprisingly, the molar mass distribution, which is typically very narrow in the case of alkoxylations with DMC catalysts, in the ejector of a loop reactor used as a reaction mixer, can be controlled by the simultaneous addition of starter compound (e.g. alcohol) and alkylene oxide, and/or that, in the case of blockwise or random addition of different alkylene oxide types, by virtue of alternating addition of the different alkylene oxides to the reaction mixture, the rapid and/or good mixing of the alkylene oxide added results in achievement of a controlled addition of the different alkylene oxides, which makes possible a desired buildup of molecular structure even in the case of use of DMC catalysts.

The present invention therefore provides a process for preparing polyethers of the formula (I)

$$R^1\text{—}(CHR^2CHR^3\text{—}O)_n\text{—}H \quad (I)$$

where
n=1 to 12 000,
$R^1$=a radical comprising at least one carbon atom and
$R^2$ and $R^3$ are each independently H or a hydrocarbon radical, where the units designated with the index n may be the same or different (the $R^2$ and $R^3$ radicals in the different units n may thus be the same or different),
by alkoxylating a starter compound which comprises the $R^1$ radical
in the presence of a double metal cyanide catalyst (DMC catalyst) in a loop reactor, which is characterized in that the alkoxylation is performed in a loop reactor which has an ejector mixing nozzle, in which all substances involved in the reaction or assistants which are not involved in the reaction, for example solvent, can be added to the circulated reaction mixture, an alkylene oxide or a plurality of different alkylene oxides being metered into the reaction mixture via the ejector mixing nozzle at the same time (random addition) or at different times (block addition).

The prior art discloses loop reactors with ejectors, for example in EP 0 419 419 (U.S. Pat. No. 5,159,092). In these loop reactors, the liquid reactor contents are circulated by means of an ejector mixing nozzle which works by the Venturi principle (a schematic illustration can be seen in FIG. 1). The reactor contents (1) are delivered with a circulation pump (2), optionally via a heat exchanger (3), through the ejector mixing nozzle (4) back into the reactor. In the gas space of the ejector mixing nozzle (7), the Venturi effect generates a reduced pressure with which either gaseous or liquid reactants (5) or the gas phase of the reactor itself (6) is sucked in and mixed intensively with the recirculated liquid. The spraying of the liquid and the suction of the liquid or gaseous components allow a very large phase exchange area to be generated. Such reactors are therefore especially also used for the performance of gas-liquid reactions which are notable for a very high reaction rate.

In the prior art, such reactor types are used for alkoxylation, for example for ethoxylation. Preference is given to using such reactor types where only small amounts of gaseous ethylene oxide are added, for example, onto alcohols. In the case of other alkoxylation processes, in which either higher molar masses are to be achieved through addition of larger amounts of alkylene oxide or other, less reactive alkylene oxides (e.g. propylene oxide, butylene oxide, styrene oxide, inter alia) are used, the rate of addition is more strongly limited by the reaction kinetics than by the mass transfer. In these cases, amounts of undepleted reactants are still found in the liquid phase. In such cases, the advantages of the ejector mixing nozzle are not manifested fully as compared to conventional techniques (for example stirred reactor or loop reactor with spraying of the liquid in the gas phase).

It has been found that, surprisingly, as a result of the use of DMC catalysts, these alkoxylation reactions which, with conventional catalysts, are limited by too low a reaction rate lead to reactions which are determined essentially only by mass transfer as a result of high reaction rates. In this way, the particular advantages of the loop reactor with an ejector can also be utilized in such alkoxylations, whose addition rate before use of the DMC catalyst was determined only by a slow reaction rate.

The performance of DMC-catalysed alkoxylations in loop reactors with ejector mixing nozzles thus offers the advantage of being able to perform all kinds of alkoxylations in which specific alkylene oxides and starter alcohols are used and/or high molar masses are to be achieved, with a high rate of addition. In particular, it is particularly advantageously possible to perform those alkoxylations in which the alkylene oxides used are propylene oxide, butylene oxide and/or styrene oxide.

The inventive performance of the alkoxylation in the presence of DMC catalyst in a loop reactor with ejector mixing nozzle has the advantage that the activation of catalyst and the distillative removal of components which are present in traces and might inhibit the catalyst can be performed particularly advantageously by "nitrogen stripping" in the loop reactor with ejector mixing nozzle. In this case, a stream of inert gas is added to the ejector mixing nozzle (8) and the volatile components are simultaneously distilled off by means of a vacuum system (9).

The process according to the invention also has the advantage that the catalyst initialization can be carried out with a smaller amount of alkylene oxide than in conventional reactors, which firstly means the advantage of increased safety, since the amount of undepleted reactant in the reactor is minimized and, secondly, the buildup of the molecular structure is not already influenced by the initialization amount of alkylene oxide.

A further advantage of the process according to the invention is that, by virtue of the always virtually constant pressure ratios of alkylene oxide and starter compound relative to the reduced pressure in the gas space of the ejector, the ratio of alkylene oxide stream and starter compound stream can be controlled very exactly and in particularly very reproducibly. In this way, the reaction can be prevented from stopping as a result of inhibition of the DMC catalyst in the case of excessively rapid addition of starter compound (e.g. alcohol), or the phase of the subsequent sole alkylene oxide addition for a given quantitative balance can be prevented from being too short to still achieve a narrow molar mass distribution in the case of excessively rapid addition of alkylene oxide.

Typically, the amount of starter compound (e.g. alcohol) should be metered in very rapidly in relation to the alkylene oxide, in order to keep the phase of simultaneous addition as short as possible or to meter in exclusively alkylene oxide for as long as possible, in order to achieve a very narrow molar mass distribution. For particular uses of the polyethers (for example for preparing organically modified siloxane compounds), it may, however, be advantageous to achieve a particular molar mass distribution with particular proportions of low molecular weight and high molecular weight compounds.

A particular advantage of the present invention, in which the ejector mixing nozzle is used as a reaction mixer for the simultaneous addition of starter compound (e.g. alcohol) and alkylene oxide, is thus that it is possible to establish the regulation of quantitative ratios with high reproducibility such that the width of the molar mass distribution and the proportion of low molecular weight and high molecular weight polyethers can be established in a controlled and reproducible manner over the period of the simultaneous addition of starter compound and alkylene oxide.

More particularly, the invention has the advantage that the molar mass distribution can be established reproducibly over the period of simultaneous addition of starter compound and alkylene oxide(s). In the case of an equal total amount of added starter compound and of alkylene oxide(s), a relatively short sole addition of alkylene oxides carried out after the combined addition leads to a broad molar mass distribution. A short simultaneous addition of starter compound and alkylene oxide and hence a longer addition of alkylene oxide(s) leads, in contrast, to a narrower molar mass distribution.

According to the desired molar mass distribution, the process according to the invention either first has a first phase in which starter compound and at least one alkylene oxide are added simultaneously, and then a phase which follows this first phase, in which one or more alkylene oxides and no starter compounds are added, the duration of the sole addition being variable, or starter compound and at least one alkylene oxide are added exclusively simultaneously over the entire reaction.

Another very particular advantage of the process according to the invention is that, by virtue of the intense mass transfer and the extremely short contact time of the reactants in the ejector mixing nozzle which functions as a reaction mixer, the tendency of the DMC catalyst to form homologous polyether chains can be reduced. Furthermore, in the reactor type described, as compared to conventional reactor types (for example stirred reactor), owing to the particularly good regulability of the alkylene oxide streams and the rapid depletion of the alkylene oxide metered in in the reaction mixer (ejector mixing nozzle), it is possible to interrupt the homologous series which tend to be formed by the DMC catalyst by means of controlled addition sequences for the different alkylene oxides.

The process according to the invention will be described by way of example hereinafter, without any intention that the invention be restricted to these illustrative embodiments. When ranges, general formulae or compound classes are specified below, these are intended to include not just the corresponding ranges or groups of compounds which are mentioned explicitly but also all sub-ranges and sub-groups of compounds which can be obtained by selecting individual values (ranges) or compounds. When documents are cited in the context of the present description, their contents shall be included fully in the disclosure-content of the present invention. When compounds which may have the different units more than once are described in the context of the present invention, they may occur in these compounds in random distribution (random oligomer) or in ordered form (block oligomer). Statements regarding the number of units in such compounds should be understood as the mean value averaged over all compounds in question.

The process according to the invention for preparing polyethers of the formula (I)

where n is selected from the ranges consisting of 1 to 12 000, 4 to 800, 20 to 400 and 80 to 200, $R^1$=a radical comprising at least one carbon atom, preferably an organic radical, preferentially an organic radical attached via a carbon atom or a heteroatom, preferably oxygen or nitrogen, especially a hydrocarbon radical attached in this way, more preferably an alkyl or alkenyl radical which is attached in this way and may be unsubstituted or substituted, especially substituted by (further) OH groups, where the $R^1$ radical is selected from the ranges consisting of 1 to 30 carbon atoms, 2 to 20 carbon atoms and 3 to 10 carbon atoms, and $R^2$ and $R^3$ are each independently H or a hydrocarbon radical, where the units designated with the index n may be the same or different (the $R^2$ and $R^3$ radicals in the different units n may thus be the same or different), by alkoxylating a starter compound which comprises the $R^1$ radical in the presence of a double metal cyanide catalyst (DMC catalyst) in a loop reactor, which is characterized in that the alkoxylation is performed in a loop reactor which has an ejector mixing nozzle, in which all substances involved in the reaction or assistants can be added to the circulated reaction mixture, an alkylene oxide or a plurality of different alkylene oxides being metered into the reaction mixture via the ejector mixing nozzle at the same time (random addition) or at different times (block addition).

The polyethers of the formula (I) prepared are preferably polyethers of the formula (II)

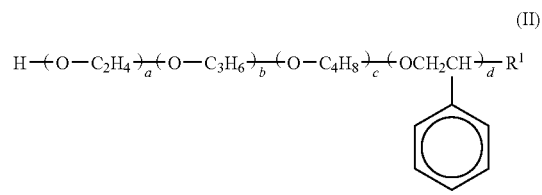

where a is selected from the ranges consisting of 0 to 300, 1 to 200, 5 to 100, 10 to 70 and 20 to 50, b is selected from the ranges consisting of 0 to 300, 1 to 200, 5 to 100, 10 to 70 and 20 to 50, c is selected from the ranges consisting of 0 to 300, 1 to 200, 5 to 100, 10 to 70 and 20 to 50, d is selected from the ranges consisting of 0 to 300, 1 to 200, 5 to 100, 10 to 70 and 20 to 50, $R^1$ is as defined above, and especially an organic radical, preferably a hydrocarbon radical, preferentially an alkyl or alkenyl radical, which may be substituted, especially substituted by (further) OH groups, and has a range of carbon atoms selected from the group consisting of 2 to 30, 2 to 20 and 3 to 10 carbon atoms, and with the proviso that at least one, preferably two, of the indices a to d is/are unequal to zero, by alkoxylating a starter compound (e.g. alcohol) which has an organic $R^1$ radical.

In the context of the present invention, starter compounds are understood to mean substances which form the beginning (start) of the polyether molecule to be prepared, which is obtained by the addition of alkylene oxide. In one embodiment of the invention, the starter compound used in the process according to the invention is selected from the group of consisting of amines, alcohols, carboxylic acids, aldehydes and ketones, preferably selected from the group of the alcohols, carboxylic acids, aldehydes and ketones. In another embodiment of the invention the starter compound used includes but is not limited to a mono- or polyhydric alcohol $R^1$—H (the H belongs to the OH group of the alcohol). The examples of polyhydric alcohols which can be used in the process according to the invention are, for example, ethylene glycol, glycerol, 1,2-, 1,3- or 1,4-butanediol, alkylglycosides, for example α-methyl-glycoside, sorbitol, mannitol, etc. In one embodiment of the invention, the polyhydric alcohols used are ethylene glycol or glycerol. The examples of monohydric alcohols are all alkanols up to $C_{30}$ and other monohydric alcohols, for example allyl alcohol. In another embodiment of the invention, the alcohols is given to using, for example, methanol, butanol, hexanol, nonanol and allyl alcohol.

The reaction mixture comprises at least one DMC catalyst, preferably finely distributed in a suspension medium. The suspension medium may either be a polyether or the starter compound (e.g. alcohol) onto which the alkylene oxide is to be added, or a mixture of the two. In one embodiment of the invention, the suspension medium is a polyether. In another embodiment of the invention, the suspension medium is a polyether whose starter compound is identical to the starter compound, preferably to the alcohol $R^1$—H. This polyether has more preferably likewise been prepared under DMC catalysis and may preferably still comprise DMC catalyst.

The DMC catalysts used may be all known DMC catalysts, preferably those which comprise zinc and cobalt, preferentially those which comprise zinc hexacyanocobaltate (III). Preference is given to using the DMC catalysts described in U.S. Pat. No. 5,158,922, US 20030119663, WO 01/80994 (U.S. 2003-158449) or in the documents cited above.

In the reaction mixture, the catalyst concentration is selected from a range consisting of >0 to 1000 ppmw (ppm by weight), >0 to 500 ppmw, 10 to 250 ppmw and 30 to 150 ppmw. When the process according to the invention is performed continuously, new catalyst can be mixed into the reaction mixture by means of the ejector mixing nozzle.

The inventive alkoxylation is performed at temperature from a range selected from the group consisting of 60 to 250° C., 100 to 180° C., and 120 to 160° C. The pressure at which the alkoxylation is performed is selected from a range consisting of 0.0002 to 10 MPa, 0.0005 to 1 MPa and 0.001 to 0.2 MPa absolute. The performance of the alkoxylation under reduced pressure allows the reaction to be performed very safely, since the reactor can be operated with a high margin from the response pressure of the safety valve. If appropriate, the alkoxylation can also be carried out under elevated pressure by the addition of inert gas (e.g. nitrogen).

To start the reaction, it may be advantageous if a reaction mixture which consists of DMC catalyst in a suspension medium is initially charged in the loop reactor, and at least one alkylene oxide, preferably only one alkylene oxide, is metered into the reaction mixture via the ejector mixing nozzle. The molar ratio of alkylene oxide to reactive groups, especially OH groups, in the starter mixture is selected from a range consisting of 0.1 to 5, 0.2 to 2, and 0.2 to 1. It may be advantageous if, before the addition of the alkylene oxide, any substances present which inhibit the reaction are removed from the reaction mixture, for example by distillation.

The process according to the invention is preferably performed in such a way that a polyether which has preferably been prepared with the desired starter compound and has more preferably been prepared with DMC catalyst and may still comprise it in suspended form is first initially charged and the DMC catalyst is suspended in this polyether. This reaction mixture is then pumped in circulation in the loop reactor. Subsequently, volatile components which can inhibit the DMC catalyst are distilled off by adding an inert gas, for example nitrogen, and applying reduced pressure. Thereafter, at least one alkylene oxide, preferably only one alkylene oxide, is metered into the reaction mixture in the ejector mixing nozzle as a starting amount. The molar ratio of alkylene oxide to reactive groups, especially OH groups, is preferably within the range specified above.

The start of the reaction can be detected, for example, by monitoring the pressure. A sudden decline in the pressure in the reactor in the case of gaseous alkylene oxides indicates that the alkylene oxide is being incorporated, the reaction has thus started and the end of the start phase has been attained.

After the start phase, i.e. after initialization of the reaction, according to the desired molar mass or molar mass distribution, either starter compound and alkylene oxide are metered in in parallel or only alkylene oxide is metered in. The molar ratio of the alkylene oxides metered in, based on the starter compound used, especially based on the number of OH groups of the starter compound used, is preferably 0.5 to 10.

The duration of addition of a particular alkylene oxide depends on the desired sequence of the alkylene oxide units in the target molecule.

The alkylene oxides used may be compounds which have the general formula (III)

(III)

where $R^2$ and $R^3$ are each independently H or a hydro-carbon radical. The hydrocarbon radical may be cyclo-aliphatic, but is especially a linear or branched hydrocarbon radical, especially a hydrocarbon radical having a range of carbon atoms selected from the group consisting of 1 to 20 and 1 to 6 carbon atoms, e.g. thyl, ethyl or phenyl radical. The $R^2$ and $R^3$ radicals may also be part of a cyclic group, in which case $R^2$ and $R^3$ form a divalent radical. The hydrocarbon radicals $R^2$ and $R^3$ may in turn bear functional groups such as halogens, hydroxyl groups and glycidyloxypropyl groups. Such alkylene oxides include epichlorohydrin, 2,3-epoxy-1-propanol, and also polyfunctional epoxide compounds such as 1,2-ethyl, 1,4-butyl and 1,6-hexyl diglycidyl ethers. In one embodiment of the invention, at least one of the two $R^2$ and $R^3$ radicals is a hydrogen. In another embodiment of the invention, the alkylene oxides used include but are not limited to, ethylene oxide, propylene oxide, 1,2- or 2,3-butylene oxide, isobutylene oxide, 1,2-dodecene oxide, styrene oxide, cyclohexene oxide, vinylcyclohexene oxide and/or styrene oxide.

The alkylene oxides used may also be glycidyl compounds, such as glycidyl ethers or glycidyl esters, whose at least one glycidyloxypropyl group is bonded via an ether or ester function to a linear or branched alkyl radical of 1 to 24 carbon atoms, an aromatic radical or cycloaliphatic radical. This class of compounds includes, for example, allyl, butyl, 2-ethylhexyl, cyclohexyl, benzyl, $C_{12}/C_{14}$-fatty alcohol, phenyl, p-tert-butylphenyl and o-cresyl glycidyl ethers. Glycidyl esters used with preference are, for example, glycidyl methacrylate, glycidyl acrylate and glycidyl neodecanoate.

To obtain various embodiment of the compounds of the formula (II) an average selected from the group consisting of 0 to 300 mol, 1 to 200 mol, 5 to 100 mol, 10 to 70 mol and 20 to 50 mol of compounds of the formula (III) where $R^2$ and $R^3$=H, and/or a range selected from the group consisting of 0 to 300 mol, 1 to 200 mol, 5 to 100 mol, 10 to 70 mol and 20 to 50 mol of compounds of the formula (III) where $R^2$=methyl and $R^3$=H, and/or a range selected from the group consisting of 0 to 300 mol, 1 to 200 mol, 5 to 100 mol, 10 to 70 mol and 20 to 50 mol of compounds of the formula (III) where $R^2$=ethyl and $R^3$=H, and/or a range selected from the group consisting of 0 to 300 mol, 1 to 200 mol, 5 to 100 mol, 10 to 70 mol and 20 to 50 mol of compounds of the formula (III) where $R^2$=phenyl and $R^3$=H, per mole of starter compound or per mole of reactive groups present in one mole of starter compound, especially OH groups, are converted in the process according to the invention.

It may be advantageous if, in the process according to the invention, an inert gas is added to the reaction mixture as an assistant via the ejector mixing nozzle and, in a vacuum system integrated into the loop reactor, components more volatile than the polyether are removed from the reaction mixture by applying a reduced pressure. In this simple manner, substances which can inhibit the catalyst, for example lower alcohols or water, can be removed from the reaction mixture. The addition of inert gas and the simultaneous removal of the more volatile components can be advantageous especially when the reaction is started up, since, on start up, the addition of the reactants or side reactions can allow inhibiting compounds to get into the reaction mixture.

The process according to the invention can be performed batchwise or continuously.

The process according to the invention allows polyethers of the formula (I) to be prepared. In particular, the process according to the invention can be used to prepare polyethers of the formula (I) which are notable in that they can be prepared in a controlled manner and reproducibly with regard to the structural buildup of the alkylene oxide units and molar mass distribution. These polyethers are particularly suitable for preparing organically modified siloxane compounds.

The present invention is illustrated in detail by FIG. 1, without any intention that the invention be restricted to the embodiment shown there.

Figure 1:
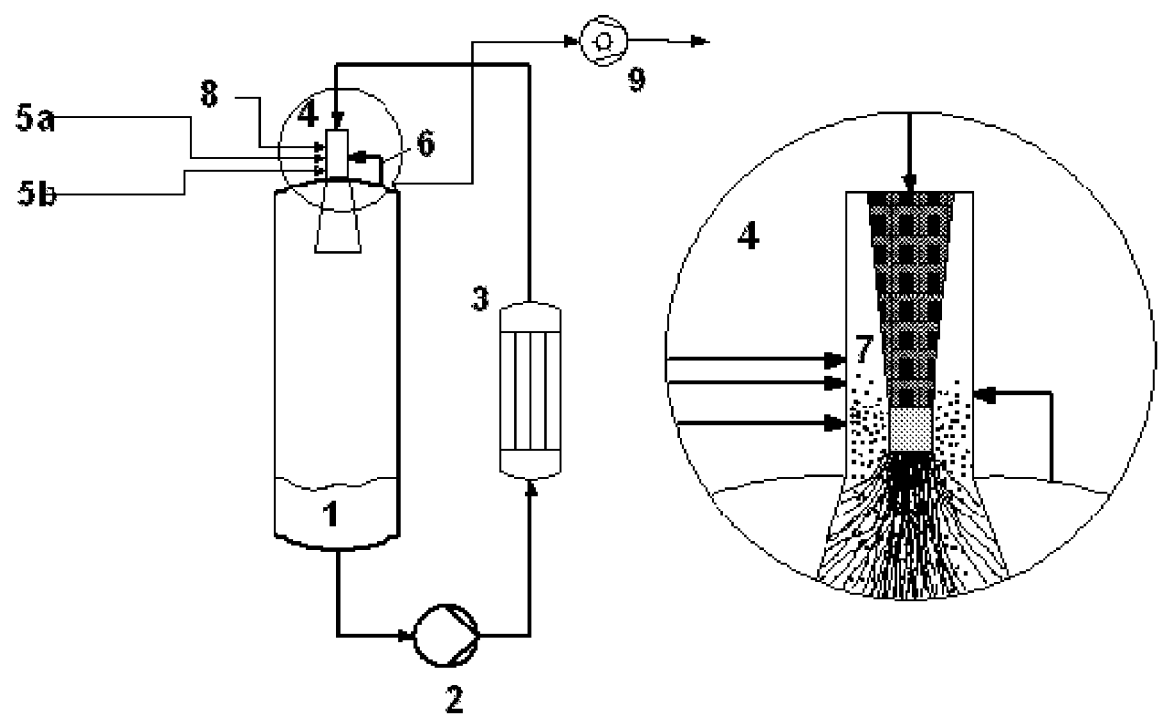
FIG. 1 shows a schematic of an embodiment of a loop reactor as can be used in the present invention. In this embodiment, the reaction mixture (1) is delivered with a circulation pump (2), if appropriate via a heat exchanger (3), through an ejector mixing nozzle (4) back into the reactor. In the gas space (7) of the ejector mixing nozzle (4), the Venturi effect generates a reduced pressure with which either gaseous or liquid reactants (5a and 5b) or the gas phase of the reactor itself (6) is sucked in and mixed intensively with the circulated reaction mixture. To control the reaction or for stripping, an inert gas (8), for example nitrogen, can also be added to the gas space (7). A vacuum system (9) can be used to remove components more volatile than the polyether prepared and/or initially charged from the reaction mixture.

Having thus described in detail various embodiments of the present invention, it is to be understood that many apparent variations thereof are possible without departing from the spirit or scope of the present invention.

The invention claimed is:

1. Process for preparing polyethers of the formula (I)

where
n=1 to 12 000,
$R^1$=a radical comprising at least one carbon atom
and
$R^2$ and $R^3$ are each independently H or a hydrocarbon radical, where the units designated with the index n may be the same or different, by alkoxylating a starter compound which comprises the $R^1$ radical in the presence of a double metal cyanide catalyst (DMC catalyst) in a loop reactor, characterized in that the alkoxylation is performed in a loop reactor which has an ejector mixing nozzle, in which all substances involved in the reaction or assistants can be added to the circulated reaction mixture, an alkylene oxide or a plurality of different alkylene oxides being metered into the reaction mixture via the ejector mixing nozzle at the same time or at different times wherein an equal total amount of added starter compound and of alkylene oxides, a relatively short sole addition of alkylene oxides carried out after the combined addition leads to a broad molar mass distribution.

2. Process according to claim 1, characterized in that the polyether of the formula (I) prepared is the polyether of the formula (II)

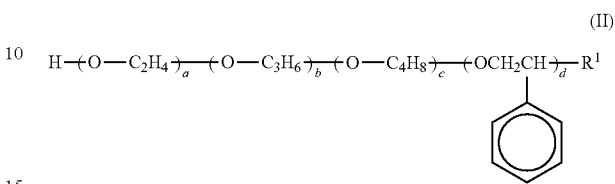

where
a is 0 to 300,
b is 0 to 300,
c is 0 to 300,
d is 0 to 300,
$R^1$ is a radical comprising at least one carbon atom
and
with the proviso that at least one of the indices a to d is unequal to zero.

3. Process according to claim 1, characterized in that it is performed batchwise.

4. Process according to claim 1, characterized in that it is performed continuously.

5. Process according to claim 1, characterized in that an inert gas is supplied to the reaction mixture via the ejector mixing nozzle and, in a vacuum system integrated in the loop reactor, components more volatile than the polyether are removed from the reaction mixture by applying a reduced pressure.

6. Process according to claim 1, characterized in that a polyether and a DMC catalyst are initially charged as the reaction mixture in the start phase and then, simultaneously, the starter compound and at least one alkylene oxide are metered into the reaction mixture.

7. Process according to claim 1, characterized in that the starter compound is selected from the group of the alcohols, carboxylic acids, aldehydes and ketones.

8. Process according to claim 7, characterized in that the starter compound used is a mono- or polyhydric alcohol.

9. Process according to claim 1 characterized in that starter compound and at least one alkylene oxide are added simultaneously in a first phase and this phase is followed by a phase of addition of one or more alkylene oxides in which no starter compound is added.

10. Process according to claim 1, characterized in that starter compound and at least one alkylene oxide are added exclusively simultaneously.

11. Process according to claim 2, characterized in that an inert gas is supplied to the reaction mixture via the ejector mixing nozzle and, in a vacuum system integrated in the loop reactor, components more volatile than the polyether are removed from the reaction mixture by applying a reduced pressure.

12. Process according to claim 11, characterized in that a polyether and a DMC catalyst are initially charged as the reaction mixture in the start phase and then, simultaneously, the starter compound and at least one alkylene oxide are metered into the reaction mixture.

13. Process according to claim 12, characterized in that the starter compound is selected from the group of the alcohols, carboxylic acids, aldehydes and ketones.

14. Process according to claim 13, characterized in that the starter compound used is a mono- or polyhydric alcohol.

15. Process according to claim 14 characterized in that starter compound and at least one alkylene oxide are added simultaneously in a first phase and this phase is followed by a phase of addition of one or more alkylene oxides in which no starter compound is added.

16. Process according to claim 15, characterized in that starter compound and at least one alkylene oxide are added exclusively simultaneously.

* * * * *